(12) United States Patent
Orchard

(10) Patent No.: US 12,669,219 B2
(45) Date of Patent: Jun. 30, 2026

(54) FUEL DELIVERY SYSTEM

(71) Applicant: Zero Emissions Aerospace Limited, Bristol (GB)

(72) Inventor: Matthew Noel Orchard, Bristol (GB)

(73) Assignee: Zero Emissions Aerospace Limited, Bristol (GB)

( * ) Notice: Subject to any disclaimer, the term of this patent is extended or adjusted under 35 U.S.C. 154(b) by 565 days.

(21) Appl. No.: 18/197,775

(22) Filed: May 16, 2023

(65) Prior Publication Data

US 2023/0375136 A1 Nov. 23, 2023

(30) Foreign Application Priority Data

May 17, 2022 (EP) ..................................... 22173793

(51) Int. Cl.
*F17C 7/04* (2006.01)
*B64D 37/30* (2006.01)

(52) U.S. Cl.
CPC ............... *F17C 7/04* (2013.01); *B64D 37/30* (2013.01); *F17C 2205/0326* (2013.01); *F17C 2205/0332* (2013.01); *F17C 2205/0352* (2013.01); *F17C 2221/012* (2013.01); *F17C 2223/0161* (2013.01); *F17C 2227/0135* (2013.01); *F17C 2227/0323* (2013.01); *F17C 2250/03* (2013.01); *F17C 2250/043* (2013.01); *F17C 2250/0439* (2013.01); *F17C 2250/0636* (2013.01); *F17C 2265/066* (2013.01); *F17C 2270/0189* (2013.01)

(58) Field of Classification Search
None
See application file for complete search history.

(56) References Cited

U.S. PATENT DOCUMENTS

| | | | |
|---|---|---|---|
| 4,098,959 A | | 7/1978 | Fanciullo |
| RE33,878 E | * | 4/1992 | Bartlett .................. F25J 1/0276 |
| | | | 62/51.1 |
| 6,716,400 B2 | | 4/2004 | Brooks et al. |
| 7,360,368 B2 | | 4/2008 | Fickel et al. |
| 7,638,213 B2 | | 12/2009 | Stukey et al. |
| 8,028,951 B2 | | 10/2011 | MacCready et al. |

(Continued)

FOREIGN PATENT DOCUMENTS

| | | | | |
|---|---|---|---|---|
| CN | 118066042 A | * | 5/2024 | ......... F02M 21/0218 |
| DE | 10160834 A1 | | 6/2003 | |

(Continued)

*Primary Examiner* — Jenna M Maroney
(74) *Attorney, Agent, or Firm* — Smartpat PLC

(57) ABSTRACT

A cryogenic liquid fuel for a vehicle is safely converted into a gas at a desired pressure. The gas is then warmed up from cryogenic temperatures so that it is in a usable range for consuming devices powering the vehicle. Waste heat from any type of consuming device is used in the most efficient way for the vehicle system. If waste heat is not readily available, then an electric heater can be optionally used. The invention can be used in conjunction with an electric motor to cool it to cryogenic temperatures to improve its performance, or to enhance the performance of the consuming device by cooling it. The system can operate passively to perform the vaporisation function, or can alternatively be actively controlled with sensors and a controller if tight margins of pressure and temperature of the fuel in its gaseous state is desired.

19 Claims, 5 Drawing Sheets

(56)             References Cited

U.S. PATENT DOCUMENTS

| | | | | |
|---|---|---|---|---|
| 9,676,491 | B2 | 6/2017 | Epstein et al. | |
| 10,168,001 | B2 * | 1/2019 | Karlsson | F17C 9/04 |
| 11,079,071 | B2 | 8/2021 | Nagura et al. | |
| 2005/0287409 | A1 | 12/2005 | Reinke et al. | |
| 2006/0060305 | A1 | 3/2006 | Klemm et al. | |
| 2006/0201164 | A1 * | 9/2006 | Fickel | F02M 21/06 |
| | | | | 62/434 |
| 2006/0220267 | A1 | 10/2006 | Kabasawa et al. | |
| 2015/0315949 | A1 * | 11/2015 | Jansson | F17C 13/026 |
| | | | | 123/2 |
| 2016/0025339 | A1 | 1/2016 | Kamath et al. | |
| 2016/0281932 | A1 * | 9/2016 | Karlsson | F02M 37/007 |
| 2017/0291486 | A1 | 10/2017 | Tanaka et al. | |
| 2018/0320822 | A1 * | 11/2018 | Mathison | F17C 5/007 |
| 2020/0309324 | A1 | 10/2020 | Law | |
| 2021/0269301 | A1 | 9/2021 | Feng et al. | |
| 2023/0375138 | A1 * | 11/2023 | Wang | B01D 53/04 |
| 2024/0110669 | A1 * | 4/2024 | Hammer | F17C 3/08 |

FOREIGN PATENT DOCUMENTS

| | | | | | |
|---|---|---|---|---|---|
| DE | 102021210616 | B3 * | 1/2023 | | F17C 3/08 |
| DE | 102023111827 | A1 * | 11/2024 | | F17C 9/02 |
| EP | 1250719 | A2 | 10/2002 | | |
| EP | 1306639 | A2 | 5/2003 | | |
| EP | 1552235 | A2 | 7/2005 | | |
| EP | 1700026 | A2 | 9/2006 | | |
| EP | 3715261 | A1 | 9/2020 | | |
| EP | 3961083 | A1 | 3/2022 | | |
| FR | 3151574 | A1 * | 1/2025 | | H01M 8/04425 |
| KR | 20150014737 | A * | 2/2015 | | F28F 1/42 |
| WO | 2006103998 | A2 | 10/2006 | | |
| WO | WO-2014091061 | A1 * | 6/2014 | | F17C 13/021 |
| WO | WO-2015067840 | A1 * | 5/2015 | | F17C 9/04 |
| WO | WO-2017011395 | A1 * | 1/2017 | | F17C 7/02 |
| WO | WO-2021014196 | A1 * | 1/2021 | | F17C 9/04 |
| WO | WO-2021209231 | A1 * | 10/2021 | | F25J 1/0065 |
| WO | WO-2024230965 | A1 * | 11/2024 | | F17C 9/02 |

* cited by examiner

FUEL DELIVERY SYSTEM

CROSS-REFERENCE TO RELATED APPLICATION

This application claims the benefit of European Patent Application EP 22173793.5 filed on May 17, 2022, the contents of which are incorporated by reference in their entireties.

TECHNICAL FIELD

This disclosure relates to a system to convert a cryogenic liquid fuel into its gaseous form at a set temperature and pressure necessary for use by a consuming device.

BACKGROUND

To create new environmentally friendly ways to power vehicles like aircraft, the use of different cryogenic fuels such as hydrogen are being promoted. Whilst hydrogen has a very good specific energy, having approximately three times the energy density of kerosene currently used by many aircraft, the problem is at ambient temperatures hydrogen occurs as a gas and occupies a very large volume for a unit of deployable energy. Storing hydrogen on a vehicle in its gaseous state will leave proportionally less usable space on the vehicle for the purpose of carrying passengers or cargo, and critically for use in an air vehicle using a fuel in such a form that requiring large volumes for storage the resultant volume will translate into a significant drag penalty.

One common solution has been to pressurise gases like hydrogen to high pressure, typically at pressures between 350 bar to 850 bar, but this comes with the great weight penalty to include the pressure vessel necessary to withstand such extreme pressures. There is also the added safety issue of dealing with such high pressures gasses on a vehicle as any leakage will both release a lot of energy as it depressurises, which could damage the vehicle in itself, and any leakage can also result in very rapid filling of the interior spaces of the vehicle with a flammable gas also endangering the vehicle.

Even making the effort to pressurize gaseous hydrogen as a means to reduce the required storage space, the density for hydrogen at the currently highest pressure of 850 bar is only 50 kilograms per cubic meter. The high mass required for the pressure tanks required to sustain such pressures can result in a fuel weight fraction of the combined tank and fuel of less than 10 percent with state-of-the-art designs. Conversely storing hydrogen as a cryogenic liquid at an ambient pressure of 1 bar can achieve a density of 70.8 kilograms per cubic meter with a much higher storage weight fraction as a heavy pressure vessel is not necessary. Even with the weight of the insulation necessary to store liquid hydrogen, fuel storage fractions around 30 percent are readily achievable with state-of-the-art designs.

Whilst storing these novel fuels in their cryogenic liquid state benefits the vehicle in terms of storage volume and fuel weight fraction, for most consuming devices the fuel needs to be converted back to its gaseous state and delivered at a set pressure. Many consuming devices, such as fuel cells, are also sensitive to the temperature of the fuel, so the fuel not only needs to be evaporated or vaporized into a gas at a set pressure but may also need to be heated to a higher operating temperature.

Prior solutions have drawn the liquid cryogenic fuel out of the storage vessel, usually by means of a mechanical pump that either sucks out the liquid fuel, or pressurises the tank to force the fuel out. This withdrawn liquid is then vaporised into a gas in a separate unit with the heating controlled by a complex sensor system. The weaknesses of such an approach includes the need to manufacture and install robust fuel lines to withdraw the liquid hydrogen from the storage tank, it includes the inherent difficulty in extracting the maximum amount of liquid fuel directly with a pipe with unusable fuel being a high probability, and it includes the need to manage the natural boil-off that occurs within the tank. There is also the problematic that such a system systematically requires active control to ensure the correct outlet pressure and temperature of the fuel in its gaseous form. The system will also cease to work if the pump to withdraw the liquid fuel from the tank fails.

SUMMARY

In general terms, the present invention provides an arrangement in which heat, preferably waste heat from a vehicle, is transferred via a heat transfer fluid to a gaseous cryogenic fuel and also, selectively, to a liquid cryogenic fuel to thereby vaporise the liquid cryogenic fuel into a gaseous cryogenic fuel.

In a first aspect, the invention provides a fuel delivery system in a vehicle, the fuel delivery system comprising: a fuel storage vessel having a liquid fuel zone configured to hold liquid cryogenic fuel and a gaseous fuel zone configured to hold gaseous cryogenic fuel; a fuel line configured to transport gaseous cryogenic fuel from the gaseous fuel zone for delivery to a fuel consuming device of the vehicle; and a heat transfer circuit comprising heat transfer fluid and an uptake heat exchange element configured to transfer heat, preferably waste heat, from a heat extraction point of the vehicle to the heat transfer fluid, the heat transfer circuit further including: a primary heat transfer circuit comprising a primary conduit within which the heat transfer fluid is able to flow, and a warming heat exchange element configured to transfer heat from the heat transfer fluid to the fuel line; a secondary heat transfer circuit comprising a secondary conduit within which the heat transfer fluid is able to flow, wherein at least a portion of the secondary conduit is located within the liquid fuel zone and is configured to transfer heat from the heat transfer fluid to the liquid fuel zone; and a selector device operable to switch the fuel delivery system between a warming configuration in which the heat transfer fluid flows within the primary heat transfer circuit but not the secondary heat transfer circuit, and a vaporising configuration in which the heat transfer fluid flows within the secondary heat transfer circuit.

A particular advantage of the present invention is its efficient use of heat, especially waste heat. In most vehicles there is an excess of heat generated in the propulsion system, for example by the fuel consuming device, or in other vehicle systems. This waste energy typically needs to be dissipated to avoid the propulsion system overheating or failing. In prior art systems this waste heat may be treated by the use of radiators or heat exchangers, using the ambient atmosphere as a heat sink, but this approach will usually require a heat exchanger system of large size. The present inventors have recognised that one of the opportunities of a vehicle having cryogenic fuel on board is the amount of heat that can be absorbed by the fuel as part of its transformation from liquid into a gas and the potential use of the heat of evaporation of the fuel to reduce the size of other cooling devices for the consumer. This gives the designer of such a system the potential to design the vehicle with a reduction in overall size and mass.

Cryogenic fuels are fuels that require storage at very low temperatures in order to maintain them in a liquid state suitable for storage on a vehicle, as described above. Such fuels are typically vaporised into gaseous form before being delivered to a fuel consuming device, such as a fuel cell or other engine.

In preferred embodiments the consuming device may comprise a fuel cell system and the fuel delivery system may convert liquid fuel into a gaseous state and deliver the fuel in its gaseous state to the fuel cell. In other embodiments the consuming device may comprise an internal combustion engine or gas turbine engine.

It is important that the gaseous fuel is delivered to the fuel consuming device within operating condition limits. For example, the pressure and/or temperature of the gaseous fuel must typically be within an allowable range. The present invention enables the temperature and pressure of the gaseous fuel to be maintained within such operating condition limits.

Waste heat may comprise any heat that is a by-product of normal operation of a vehicle system. Thus, waste heat does not include heat that is generated by a heating element or other device whose primary purpose is to generate heat. Thus in preferred embodiments the heat extraction point does not include a heating element or other device whose primary purpose is to generate heat.

The invention uses waste heat from the fuel consuming device in preferred embodiments. It takes heat from the consuming device from a convenient system element such as an exhaust of the consuming device or via cooling circuits directly embodied in the consuming device, transferring this heat uptake into the heat transfer fluid via a dedicated heat exchanger or through simply proximity to a heat source associated with the consumer unit. The heat transferred to the heat transfer fluid is used to transform the stored cryogenic liquid fuel in two distinct stages. In the first stage, associated with the primary heat transfer circuit, it will warm gaseous cryogenic fuel to a desired gaseous fuel working temperature suitable for delivery to the consuming device. In the second stage, associated with the secondary heat transfer circuit, it will create pressurised gaseous fuel at a cryogenic temperature inside the fuel storage tank via a boil-off process.

Thus, in some embodiments the heat extraction point of the vehicle is located in one or more of: a fuel consuming device configured to consume fuel delivered by the fuel delivery system; an air intake of a fuel consuming device configured to consume fuel delivered to the heat transfer fluid; an electric motor; a cooling radiator; and an exhaust of a fuel consuming device configured to consume fuel delivered to the heat transfer fluid. By removing waste heat from these vehicle systems, their operating efficiency may be improved.

There are several preferred embodiments for the uptake heat exchanger, which transfers heat into the heat transfer fluid. Any state-of-the-art heat transfer device can be used as part of the invention to extract the heat used to perform the vaporization and to transfer heat for the warming of the gaseous fuel. This may be through a direct connection to a cooling loop embedded into the consuming device, for example a cooling channel through the plates of a directly cooled fuel cell, or even using the heat transfer fluid to cryogenically cool a connected electric motor in the powertrain with the efficiency benefits this cryogenic operation brings. Other embodiments for the heat extraction could be from positioning an uptake heat exchanger to be used as an intercooler to cool the consumer intake air that has been heated from the compression operation on the intake air. Another possibility is taking waste heat from the exhaust of the consumer. It is also possible in some embodiments that this uptake heat exchanger could simply take heat from the ambient air surrounding the vehicle, whilst having no direct connection to the consuming device.

In very specific configurations where waste heat is not accessible, potentially due to peculiar aspects of the configuration of the vehicle, then in alternative embodiments the heat extraction point may comprise a heating element or other heat-generating device. That is, the uptake of waste heat may be replaced with direct electrical heating, although this will likely result in a reduction in some of the performance benefits of the invention.

The selector device may comprise a selective valve, which in preferred embodiments is a four-port/two-way valve. The valve is preferably arranged to selectively make the heat transfer fluid flow through the primary circuit alone, or to create a combined circuit joining the primary and secondary circuits together so the heat transfer fluid flows through both.

In preferred embodiments the selector device will be pressure actuated to open and close the valve passively, opening to connect the secondary circuit to heat the liquid fuel in the storage vessel when the gas pressure in the ullage space of the storage vessel drops below a pre-set level.

For example, the selector device may comprise a pressure-actuated valve operable to automatically switch the fuel delivery system to the vaporising configuration if a pressure in the gaseous fuel zone falls to a first threshold pressure. The pressure-actuated valve may further be operable to automatically switch the fuel delivery system to the warming configuration if a pressure in the gaseous fuel zone increases to a second threshold pressure. In some embodiments the first threshold pressure and second threshold pressure may be the same.

Such a pressure actuation arrangement passively ensures that a suitable gaseous fuel pressure is maintained until all the liquid fuel in the storage vessel is vaporised.

Alternative embodiments can achieve the same function through the use of pressure sensors and electrical actuation of the selector device to a sequence defined in a programmable controller to ensure the maintenance of a suitable gaseous fuel pressure at all times.

For example, the system may include a pressure sensor configured to monitor a pressure in the gaseous fuel zone, and a controller configured to operate the selector device to switch the fuel delivery system to the vaporising configuration if the pressure sensor detects a pressure fall to a threshold pressure.

The controller may further be configured to operate the selector device to switch the fuel delivery system to the warming configuration if the pressure sensor detects a pressure rise to the threshold pressure.

An important role of the selector device is to substantially stop the heat transfer into the liquid fuel zone of the fuel storage vessel once enough gaseous fuel pressure in the gaseous fuel zone is attained. It achieves this by switching the fuel delivery system to the warming configuration to thereby substantially stop the heat transfer into the storage vessel, to stop boil-off (vaporisation) occurring and prevent over pressurising the storage vessel. In some embodiments of the invention the fuel storage vessel includes a pressure-relief valve configured to vent gaseous fuel in the event of an over-pressure; thus, any over-pressure caused by excess vaporisation will cause fuel wastage.

This aim is further achieved in some embodiments by thermally isolating the secondary heat transfer circuit from the primary transfer circuit. Thus, the secondary conduit is preferably thermally isolated from the primary conduit. The heat transfer circuit may comprise one or more thermal isolation elements located between the secondary conduit and the primary conduit for restricting heat transfer from the secondary conduit to the primary conduit.

This arrangement serves to avoid heat being conducted through the pipework of the circuit independent of flow of the heat transfer liquid or not. In preferred embodiments this thermal isolation is achieved by having a specific thermal isolation element in the circuit, made of an appropriate non-conductive material that is also able to operate across the temperature range of the heat transfer circuit using a material such as specific plastic like polytetrafluoroethylene.

Preferably, in the vaporising configuration the heat transfer fluid flows within the secondary heat transfer circuit and the primary heat transfer circuit. Thus, heat is continuously transferred from the heat transfer fluid to the gaseous fuel in the fuel line, even while fuel is being vaporised in the fuel storage vessel as a result of the transfer of heat from the heat transfer fluid to the liquid fuel in the liquid fuel zone.

In related embodiments the uptake heat exchange element is located within the primary heat transfer circuit. Thus, a continuous flow can be achieved through the uptake heat exchange element and the warming heat exchange element in the warming configuration.

Optionally, the heat transfer fluid flows from the primary heat transfer circuit to the secondary heat transfer circuit. Further optionally the heat transfer fluid flows from the secondary heat transfer circuit to the uptake heat exchange element. Yet further optionally the heat transfer fluid from the uptake heat exchange element to the primary heat transfer circuit. Thus, the heat transfer fluid flows in a continuous circuit between uptake heat exchange element, primary heat transfer circuit, and secondary heat transfer circuit.

The selector device may be located at a junction between the primary heat transfer circuit and the secondary heat transfer circuit. The selector device thus may be configured to be operable to prevent flow of heat transfer fluid from the primary heat transfer circuit into the secondary heat transfer circuit and/or from the secondary heat transfer circuit to the primary heat transfer circuit. In preferred embodiments the heat transfer fluid will flow in reverse to the flow of the fuel it is treating. That is, the heat transfer circuit is preferably configured so that the heat transfer fluid flows from the uptake heat exchange element to the fuel storage vessel in a generally opposite direction to a flow of fuel from the fuel storage vessel to the uptake heat exchange element. Therefore, after the heat transfer fluid has heat transferred to it from the consuming device or a connected system, in the first step the heat transfer fluid is used to warm fuel that is in its gaseous state to the desired temperature via a dedicated warming heat exchange element. Then, when necessary, in a second step the heat transfer fluid is used to transfer heat into the liquid fuel in the storage vessel to generate controlled boil-off from the liquid fuel. This boil-off creates a volume of pressurised gas at a cryogenic temperature in the ullage space of the storage vessel, which can be drawn off at a targeted fuel pressure, optionally using a pressure reducer to control the gas supply pressure. This will subsequently pass through the warming heat exchanger, in an opposite direction to the flow of the heat transfer fluid in preferred embodiments. The targeted fuel supply pressure will account for the pressure rise occurring due to the warming process, giving an output of the fuel delivery system of gaseous fuel at the desired temperature and pressure to the consuming device.

The heat transfer fluid used must have the characteristics of not freezing at the temperature of the liquid cryogenic fuel, whilst also being stable at the highest temperature of heat exchange from the consuming device. This heat transfer fluid will in preferred embodiments also be non-flammable to promote safety of the integrated system in case of any failures. In preferred embodiments with liquid hydrogen as the cryogenic fuel, a suitable non-flammable secondary heat transfer medium that would not freeze at the temperature of liquid hydrogen and is stable at the necessary high temperatures may be helium.

The extraction or uptake of heat generated by the consuming device in preferred embodiments will preferably be taken from a point in the system connected to the consuming device that has a maximum temperature that will ensure that the final warmed fuel in its gaseous state will not exceed the maximum allowed fuel input temperature or pressure for the consuming device. Thus, preferably the uptake heat exchange element is located such that a maximum temperature at the heat extraction point provides a maximum temperature of the gaseous fuel that is equal to or less than a maximum permitted fuel input temperature of the fuel consuming device of the vehicle. This siting of the heat extraction point and the thermal analysis used in the selection of this point should take into account thermal losses and potential failure conditions of the consuming device and its associated systems, as well as potential failures of the fuel delivery system that can affect the heat transfer. In selecting the heat extraction point in this manner if the intake fuel temperature requirement band is wide enough, no temperature control or heat transfer fluid flow control in the heat transfer circuit will be necessary as the maximum treated fuel temperature is set by the maximum heat transfer into the circuit.

The heat transfer circuit will preferably be an interconnected but split circuit, comprising two distinct sub-circuits connected by a valve that will selectively direct and connect the flow from the primary circuit into an extension created by a secondary circuit so that that joined together they create one combined longer circuit. The primary circuit will preferably include the uptake heat exchanger device for extracting heat from the consumer and/or its related cooling or exhaust systems, and a separate warming heat exchanger to transfer some of this extracted heat from the heat transfer fluid into the fuel in its gaseous state to warm it to the target temperature range needed for the consuming device.

In preferred embodiments if the acceptable fuel intake temperature range of the consumer is wide enough, and the heat extraction point is suitably chosen, then the vaporiser system can run at a constant flow rate of the heat transfer fluid without any dedicated sensors or control.

In alternative embodiments, for instance if the required fuel intake temperature range has a narrow band, or if adjustment of heat transfer can optimise any part of the propulsion system performance, then active control of the heat transfer using sensors monitoring the gaseous fuel pressure and fuel supply temperature and the ability to adjust the flow rate of the heat transfer fluid can be used.

For example, the heat transfer circuit may comprise a pump for circulating the heat transfer fluid, the pump being controllable to vary a flow rate of the heat transfer fluid. By modifying the flow rate, it is possible to adjust the rate of heat transfer.

In addition, the fuel delivery system may include one or more fuel line sensors configured to detect one or more parameters of fuel delivered by the fuel line, the pump being controllable to vary a flow rate of the heat transfer fluid in response to parameters detected by the one or more fuel line sensors. Optionally, the one or more parameters include temperature and/or pressure.

Active adjustment of the extracting heat exchanger may also be employed as a means to control the heat transfer. For instance, part of the heat exchanger may be selectively shut off by a valve, or the heating fluid (such as the consuming device exhaust) may be directed away from complete impingement on the heat exchanger The secondary conduit is located within the fuel storage vessel so that in usual operations at least a portion thereof will be immersed into the cryogenic liquid fuel. In preferred embodiments this route will include passing through the lowest possible parts of the storage vessel so that the line will be immersed in the liquid fuel until the very lowest fuel states and therefore able to boil-off the maximum amount of liquid fuel. Depending on the required fuel consumption rates of the consuming device, the length of the portion of the secondary conduit within the storage vessel may be increased or shortened to match the required heat transfer rates so that the required gas generation can be maintained for any power level required from the consuming device for the vehicle's mission. In some embodiments fins may be added to the line of the secondary circuit within the storage vessel to increase the heat transfer potential of the line, or even a dedicated heat exchanger added to transfer heat from the heat transfer fluid into the cryogenic liquid fuel. Thus, in some embodiments the at least a portion of the secondary conduit located within the liquid fuel zone comprises one or more heat transfer fins.

Whilst in preferred embodiments the heat transfer fluid used in the fuel delivery system will be non-flammable, meaning leaks of the heat transfer fluid will not cause a fire, a leak may still contaminate the fuel which may disrupt the operation of the consuming device. Such a leak would also ultimately cause the heat transfer of the vaporizer system to lessen and substantially stop, which if a single vaporizer system is used to supply the consuming device would cause fuel starvation which could jeopardise the safe operation of the vehicle. For both these reasons in preferred embodiments double layered pipelines will be used so that a failure in an individual pipe would not compromise the integrity of the overall system. Thus, the primary and/or secondary conduits may comprise a double-walled pipe comprising an inner pipe and an outer pipe, wherein the inner pipe and the outer pipe are thermally connected to permit thermal transfer therebetween. This would in preferred embodiments comprise of an inner pipe of stainless steel and an outer pipe of aluminium with direct contact between the two layers to maintain good thermal conductivity to ensure the function of the heat transfer to enable boil-off is efficient. For example, the inner pipe and the outer pipe may be connected via a close fit or interference fit.

A second aspect of the present invention provides a method of delivering cryogenic fuel using a fuel delivery system according to the first aspect, comprising the steps of: circulating the heat transfer fluid within the heat transfer circuit to transfer waste heat from the heat extraction point of the vehicle to the heat transfer fluid; and selectively operating the selector device to: switch the fuel delivery system to the warming configuration to circulate the heat transfer fluid within only the primary heat transfer circuit to transfer heat from the heat transfer fluid to the fuel line; and switch the fuel delivery system to the vaporising configuration to circulate the heat transfer fluid within the secondary heat transfer circuit to transfer heat from the heat transfer fluid to the liquid fuel zone.

The method may further include operating the selector device to switch the fuel delivery system to the vaporising configuration in response to a fall of a pressure in the gaseous fuel zone to a first threshold pressure, to thereby circulate the heat transfer fluid within the secondary heat transfer circuit to transfer heat from the heat transfer fluid to the liquid fuel zone.

Alternatively, or in addition, the method may further include operating the selector device to switch the fuel delivery system to the warming configuration in response to an increase of a pressure in the gaseous fuel zone to a second threshold pressure, to thereby circulate the heat transfer fluid within only the primary heat transfer circuit to transfer heat from the heat transfer fluid to the fuel line.

In some embodiments the first threshold pressure may be equal to the second threshold pressure.

A third aspect of the invention provides a method of delivering fuel to a vehicle comprising: a heat extraction point; a fuel storage vessel having a liquid fuel zone containing liquid cryogenic fuel and a gaseous fuel zone containing gaseous cryogenic fuel; and a fuel line configured to transport gaseous cryogenic fuel from the gaseous fuel zone for delivery to a fuel consuming device of the vehicle, wherein the method includes the steps of: providing a heat transfer circuit comprising heat transfer fluid, and a selector device to control flow of the heat transfer fluid; transferring heat, preferably waste heat, from the heat extraction point to the heat transfer fluid; operating the selector device to provide a warming configuration to transfer heat from the heat transfer fluid to the fuel line; and operating the selector device to provide a vaporising configuration to transfer heat from the heat transfer fluid to the liquid fuel zone.

Further possible aspects of the invention are set out in the clauses below.

1. A vaporizer system (for use in vehicles that use cryogenic fuel) to convert liquid cryogenic fuel to gaseous fuel at a required temperature and pressure for use in a consuming device that uses waste heat from the consuming device to heat a heat transfer fluid that via controlled and selective passage through two circuits using a valve causes separate processes of controlled boil-off of the liquid fuel and warming of the fuel in its gaseous state.

2. A vaporizer system of clause 1 where the system control is entirely passively operating and the boil-off of the cryogenic liquid is passively controlled by a pressure actuated valve that selectively allows a heat transfer fluid into a circuit enabling boil-off of the cryogenic liquid only when necessary to avoid over-pressure and wasteful boil-off 3. A vaporizer system of clause 1 where helium is used as a heat transfer fluid.

4. A vaporizer system of clause 1 where the positioning of the heat uptake is positioned in the propulsion system such a way that even at maximum operating temperature of the consuming device it cannot heat the heat transfer fluid to a point that it overheats the warmed gaseous fuel or can only cause the gaseous fuel to be heated to the correct operating temperature.

5. A vaporiser system where the cooling effect of the heat extraction from a system on the vehicle is designed to be beneficial to the vehicle operation, such as cryogenically cooling an electric motor to enhance its efficiency, or to cool the intake air to a consuming device increase the performance of the consuming device, or to reduce the size of radiators otherwise needed to cool a system on the vehicle.

6. A vaporizer system of clause 1 that is actively controlled using inputs from sensors that monitor any parameters of the system such as temperature and pressure, and using this monitoring actively activate valves and control pumps using a programmable device.

7. The use of double layer pipes in the vaporizer system to give protection from a single failure causing leakage.

8. The use of double layer pipes in the vaporizer system where the two pipes are of conductive material and have a close or interference fit to ensure good thermal heat transfer.

Any of the features described herein may be applied to any aspect of the invention, either individually or in any combination. In particular, features of the first aspect may be applied to the second or third aspects. Similarly, features of the second or third aspects may be applied to the first aspect.

BRIEF DESCRIPTION OF THE DRAWINGS

One or more embodiments of the invention will now be described, by way of example only, with reference to the accompanying drawings, in which.

DETAILED DESCRIPTION

Figure 1:
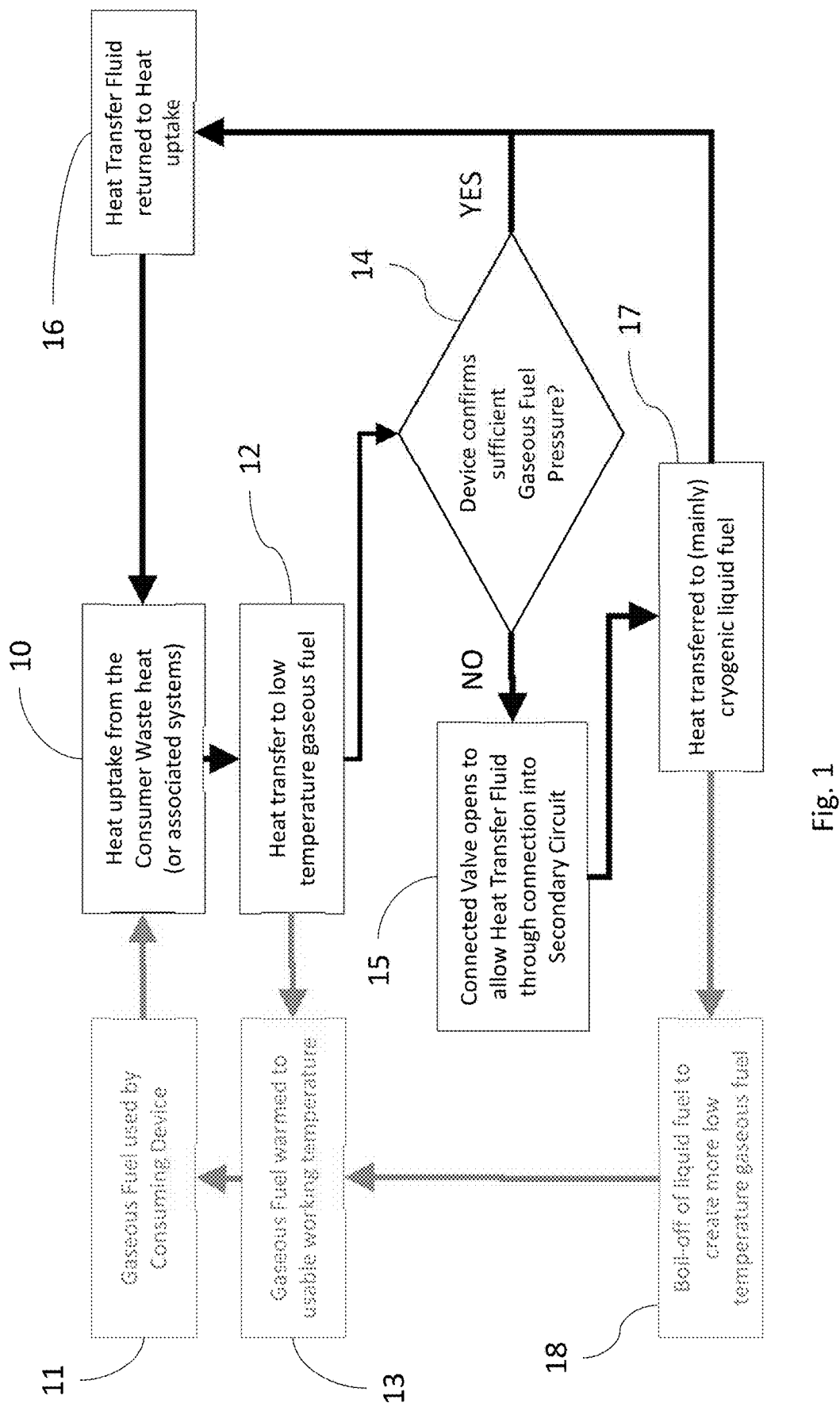
FIG. 1 illustrates the system logic of an embodiment of the invention.

In FIG. 1 a top-level description of the system logic and function is illustrated. In preferred embodiments this starts with a heat uptake 10 (e.g. uptake heat exchange element) extracting heat from waste heat created at a heat extraction point of the vehicle and transferring it into a heat transfer fluid. For example, the waste heat may be created by the fuel consuming device 11. A suitable heat transfer fluid can function effectively at both high temperatures and cryogenic temperatures. A suitable heat transfer fluid may be helium. The heat transfer fluid may consist essentially of high-purity helium, comprising more than 95% helium, and more preferably more than 99% helium. The means for the heat uptake 10 may be a heat exchanger placed in the exhaust of the consuming device 11, it may be formed by passing the heat transfer fluid through cooling channels in the consuming device 11, it may be formed by an intercooler device in the air intake of the consuming device 11, or by utilising other similar positions where waste heat is produced. It is also possible to extract the heat independent of the consuming device 11, for example the heat uptake 10 in alternative embodiments could be directly from ambient air, or even an electrical heating element.

In preferred embodiments the siting of the heat uptake 10 in relation to the consuming device 11 or overall vehicle system will be such that the maximum temperature of the heat transfer fluid can achieve through heating cannot exceed the maximum usable temperature 13 for the gaseous fuel for use in the consuming device 11.

The flow path of the heat transfer fluid in in the illustrated embodiments is sequentially from the heat uptake 10 to a heat transfer device (e.g. warming heat exchange element) to cause a heat transfer 12 to the low temperature gaseous fuel to warm it to a usable temperature 13. This heat transfer 12 in preferred embodiments will be via a dedicated heat exchanger, but any heat transfer device may be used.

In preferred embodiments the heat uptake 10 position would be assessed against temperatures for usual operations and temperatures for any high probability failure conditions for the heat source, for example the exhaust system of the consuming device 11 would be one potential heat source. Other potential heat sources could be a separate fluid cooling circuit for the consuming device 11, a conductive attachment to the consuming device 11, or even heat from a completely independent system on the vehicle. The heat uptake 10 will be positioned at a point in the heat source flow path where the maximum temperature, minus the transport temperature loss from the heat transfer fluid travelling to the point of the heat transport 12, is equal or below the maximum allowable usable temperature 13 for supply to the consuming device 11. To allow for difficulties in accommodating failure condition temperatures of the consuming device 11, it may be possible in some embodiments to use a higher transient temperature in selecting the heat uptake 10 position, but with certain safety inspections or procedures after a failure event.

Next in sequence the system will determine by passive or active control means using a determining device 14 such as a sensor to confirm whether the gaseous fuel supply pressure is sufficient or not for the correct ongoing operation of the consuming device 11. If the determining device 14 confirms the gaseous pressure is sufficient, then the connected valve 15 will remain closed and will return the heat transfer fluid 16 to the heat uptake 10, with the cycle operating in a continuous manner.

If, however the determining device 14 detects that the gaseous fuel pressure is low or insufficient, then the connected valve 15 will move to the open position and connect the secondary heating circuit which causes the heat transfer fluid to pass through pipelines positioned within the liquid fuel zone of the fuel storage vessel so that it is immersed within the stored cryogenic liquid fuel 17. This in turn causes a heat transfer that creates boil-off from the liquid fuel as a low temperature gas 18 collating in the ullage space (gaseous fuel zone) of the storage vessel. After passing through the stored cryogenic liquid fuel 17 the heat transfer fluid flow path will reconnect to the primary circuit and will return the heat transfer fluid 16 to the heat uptake 10, continuing the cycle in a continuous manner. The connected valve 15 will stay in this open position until sufficient gaseous fuel pressure has built up, when it will close and stop the heat transfer fluid passing through the stored cryogenic liquid fuel 17. The selection of the suitable pressure for the operation of the detection device 14 and connected valve 15 will take into account the maximum fuel consumption rate of the consuming device 11, the available storage space for gaseous fuel and the available heat transfer rates for creating boil-off to regenerate gaseous fuel pressure to ensure that the connected vehicle cannot be starved of fuel in any normal operating state.

Figure 2:
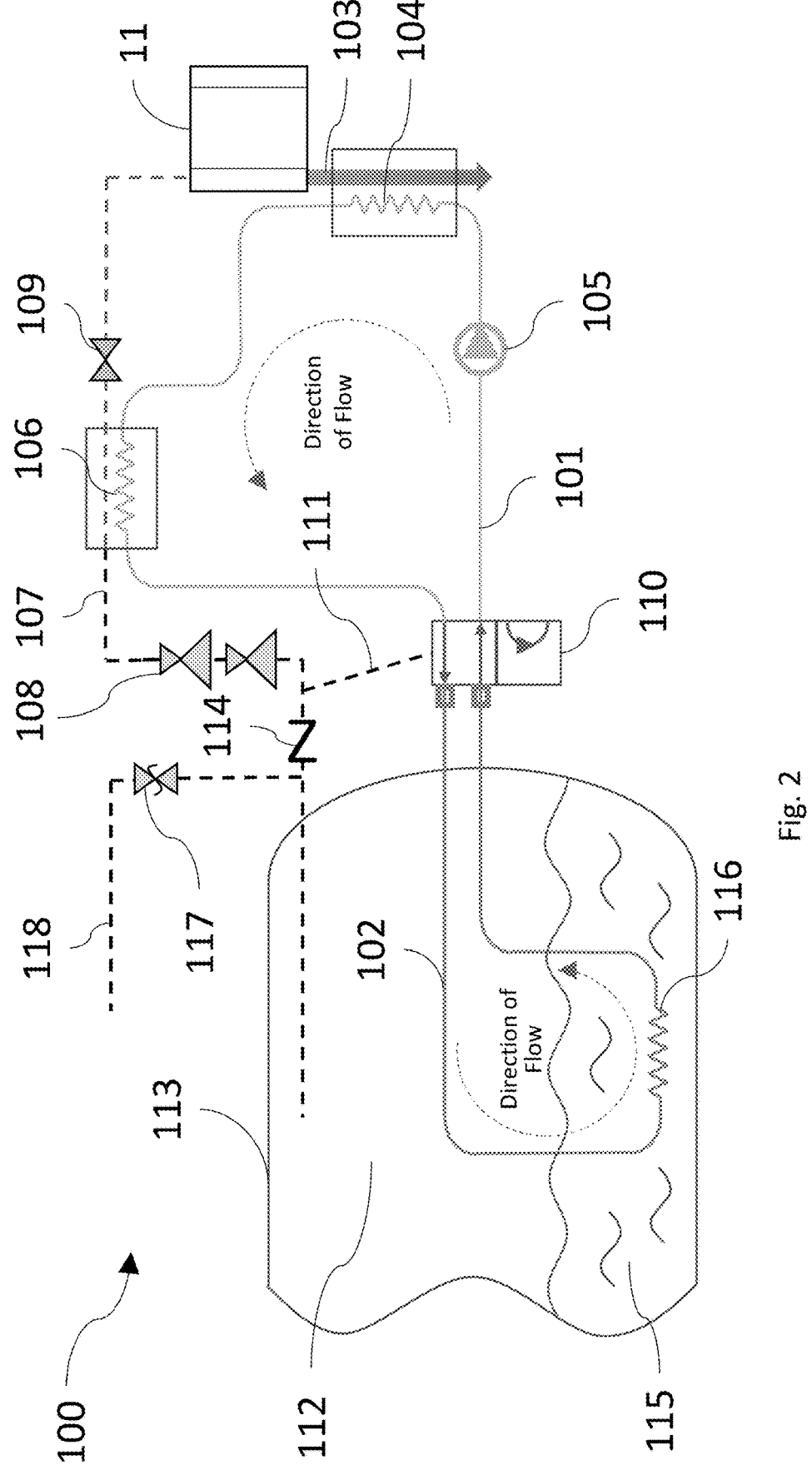
FIG. 2 illustrates an embodiment of the invention, using passive control of the system, with the primary and secondary circuits connected by the main valve.

FIG. 2 shows an embodiment of the invention with a passively controlled system 100 of the vaporization and warming process, consisting of a primary circuit 101 and a secondary circuit 102 of pipework for the transmission of the heat transfer fluid. The process is driven in preferred embodiments by the waste heat 103 of the consuming device 11, which may be a fuel cell, internal combustion engine, electric motor or other motive device. The waste heat 103 in the illustration of FIG. 2 is taken from the exhaust using an uptake heat exchanger 104, but other embodiments may take the heat from compressed intake air using an intercooler device, or may pass the heat transfer fluid directly through cooling-heating channels directly embedded in the consuming device 11 device and used to cool the consuming device 11. Where direct cooling is used, the invention may cryogenically cool the consuming device 11 or other element of the powertrain which may benefit the performance for instance if the powertrain includes an electric motor.

The flow of the heat transfer fluid in the illustrated preferred embodiment is ensured by the inclusion of a pump 105 in the circuit, which in passively controlled 100 systems may operate at a constant speed or flow rate, or may alternatively be mechanically connected to the consuming device to vary the flow rate with the speed of the consumer. Alternatively, the pump 105 may be variable speed with a connection to the overall propulsion system controller (not shown). The pump 105 may be placed anywhere in the primary circuit 101, but in preferred embodiments will be placed upstream of the uptake heat exchanger 104 to benefit from operating with the heat transfer fluid it is acting on being at a lower temperature. Alternative embodiments of the invention may avoid the use of the pump 105 through the manipulation of the convection caused by the uptake of heat to create a flow.

The direction of flow of the heat transfer fluid in the circuit is shown in FIG. 2 for preferred embodiments, which will in the first instance after passing through the uptake heat exchanger 104 will pass through the warming heat exchanger 106, which transfers heat from the heat transfer fluid into the gaseous fuel as it passes through warming heat exchanger 106. In preferred embodiments the siting of the uptake heat exchanger 104 will be in a position where the maximum uptake temperature does not exceed the maximum working temperature of the gaseous fuel for the consuming device 11 at the warming heat exchanger 106 location. This will give inherent safety to the system and provide the consuming device 11 with the correct conditions.

On the gaseous fuel supply line 107, upstream of the warming heat exchanger 106 will be a pressure regulating or pressure reducing valve 108 that will restrict the release of gaseous fuel to no more than the pressure allowed by the consuming device 11. The pressure setting of the pressure reducing valve 108 will take into account the pressurization effect of the warming heat exchanger 106 to ensure that the gaseous fuel entering the consuming device 11 is within the maximum allowed working pressure even if the shut off valve 109 is closed for a period with residual warming of the gaseous fuel in the warming heat exchanger 106. The pressure reducing valve 108 may be duplicated in series to create redundancy in the system in preferred embodiments.

Illustrated in FIG. 2 for the preferred embodiment the direction of flow of the heat transfer fluid will next transverse through the main valve 110, which will selectively close to connect the primary circuit 101 only, or open to connect both the primary circuit 101 and the secondary circuit 102 into a combined larger circuit. In preferred embodiments this main valve 110 will be a four port, two position valve. In the passively controlled system 100 as shown, this valve will be acted upon by a pressure connection 111 in communication with the gaseous fuel storage volume 112 or ullage of the storage vessel 113. The pressure connection 111 and downstream elements of the gaseous fuel supply line 107 in preferred embodiments may be protected from ingress of liquid fuel due to slosh or other effects on the vehicle by the presence of a check valve 114.

If the gaseous fuel pressure in the gaseous fuel storage volume 112 and hence the pressure connection 111 drops below a predefined pressure level, then the reduction in pressure will cause the main valve 110 to open connecting the secondary circuit 102 as illustrated in FIG. 2 and allowing the heat transfer fluid to pass through the secondary circuit 102. As the secondary circuit 102 will in preferred embodiments have part of the pipeline located towards the bottom of the storage vessel 113, this will cause the secondary circuit 102 to have an element submerged within the liquid cryogenic fuel 115 in most fuel states and instances of operation. The heat transfer from heat transfer fluid travelling though the secondary circuit 102 into the liquid cryogenic fuel 115 will cause boil-off (i.e. vaporisation) of the liquid cryogenic fuel 115 and a build-up of pressurized gas in the gaseous fuel volume 112. In some embodiments the secondary circuit 102 may have dedicated heat transfer elements 116, such as heat transfer fins, to enhance the heat transfer into the liquid cryogenic fuel 115 beyond that obtainable with plain pipework.

The traversing of the circuit is then completed as the heat transfer fluid travels through the secondary circuit 102 exiting the storage vessel 113, transitioning through the main valve 110 and re-joining the primary circuit 101 to travel through the pump 105 and back to the heat uptake heat exchanger 104.

Whilst in normal operation the pressure of the gaseous fuel in the gaseous fuel storage volume 112 will be managed through the opening and closing of the main valve 110 to a pressure range that does not exceed the structural limits of the storage vessel 113, to protect against failure conditions in preferred embodiments a pressure relief valve 117 that opens to release excess pressure in the storage vessel 113 through a vent line 118 to a safe location from the vehicle can be included.

Figure 3:
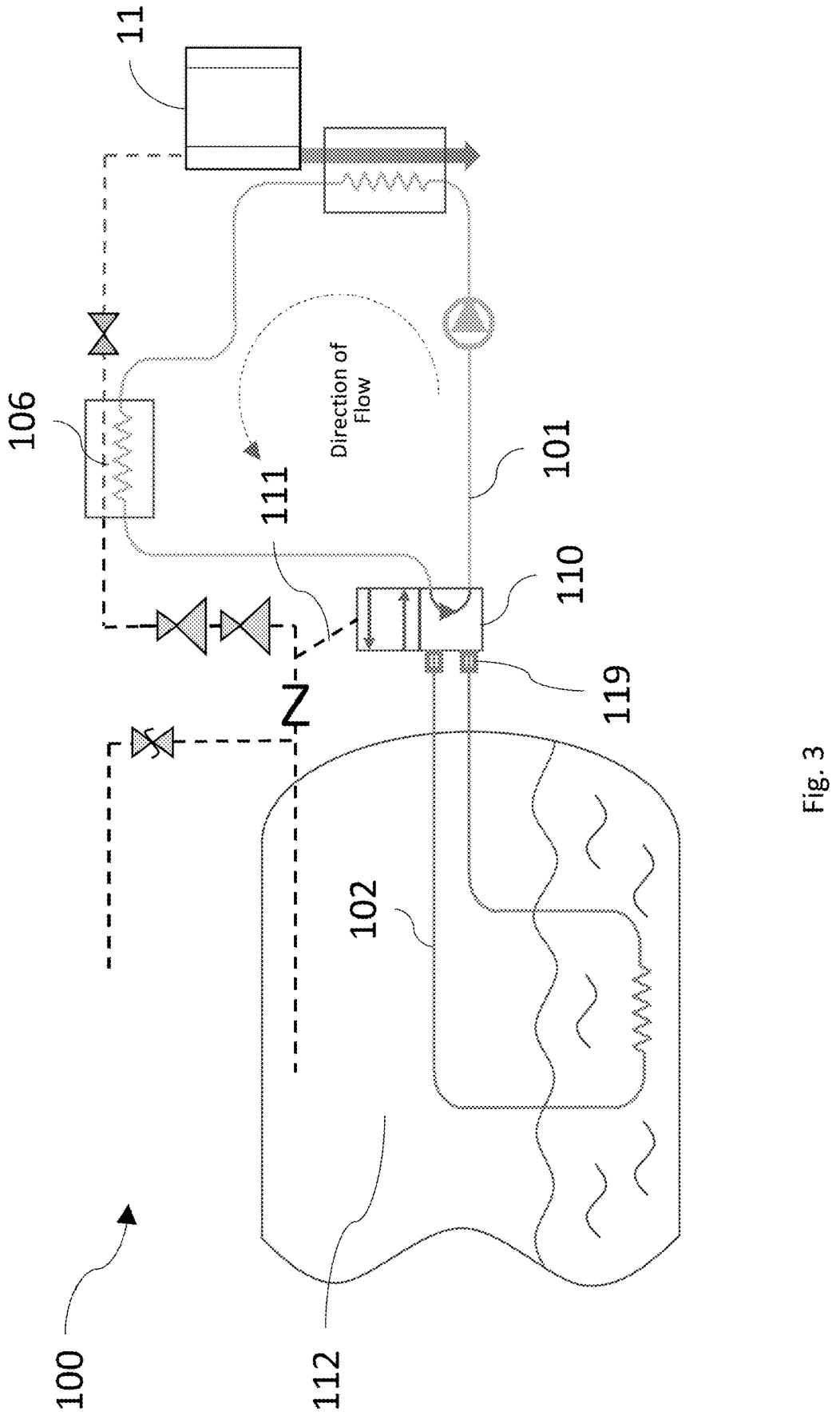
FIG. 3 illustrates an embodiment of the invention, using passive control of the system, with the secondary circuit disconnected by the main valve.

In the illustration of FIG. 3 the invention with a passive control system 100 is shown in the state where the pressure of the gaseous fuel in the gaseous fuel storage volume 112 is above the predetermined target pressure and the pressure connection 111 to the main valve 110 causes the main valve 110 to be positioned in the 'closed' position. When the main valve 110 is in the 'closed' position only the primary circuit 101 is connected for the heat transfer fluid to flow. This still maintains the functioning of the warming heat exchanger 106 to warm the gaseous fuel to the required operating temperature of the consuming device 11. The secondary circuit 102 on the other hand in this state with the main valve 110 closed is cut off and without flow of the heat transfer fluid, so the heat transfer fluid selected must be chosen such that it does not freeze as it cools to the temperature of the surrounding liquid cryogenic fuel 115. This is particularly important for periods where the consuming device 11 is not in use and the liquid cryogenic fuel 115 will completely cold soak the secondary circuit 102 and its contained heat transfer fluid.

An important aspect of the function of the system is that when the main valve 110 is in the 'closed' position is not only should the heat transfer fluid flow be stopped in the secondary circuit 102, but any other transfer of heat into the storage vessel 113 and secondary circuit 102 must be avoided or minimised. As an example, if the continuum of the primary circuit, main valve 110 and secondary circuit 102 are all conductive metal, then heat will be transferred into the storage vessel 113 by conduction. For this reason, in preferred embodiments thermal isolating elements 119 will be included in the circuit to create a thermal isolation of the secondary circuit 102, and the main valve 110 will also preferably made of non-conductive materials such as high entropy ceramics to minimise heat transfer into the secondary circuit 102. These thermal isolating elements 119 will form a break between any high thermally conductive pipework of the secondary circuit 102 and the primary circuit 101 (including the main valve 110) and the thermal isolating elements 119 will be made of a suitable low conductive material, which may be polytetrafluoroethylene in preferred embodiments.

Figure 4:
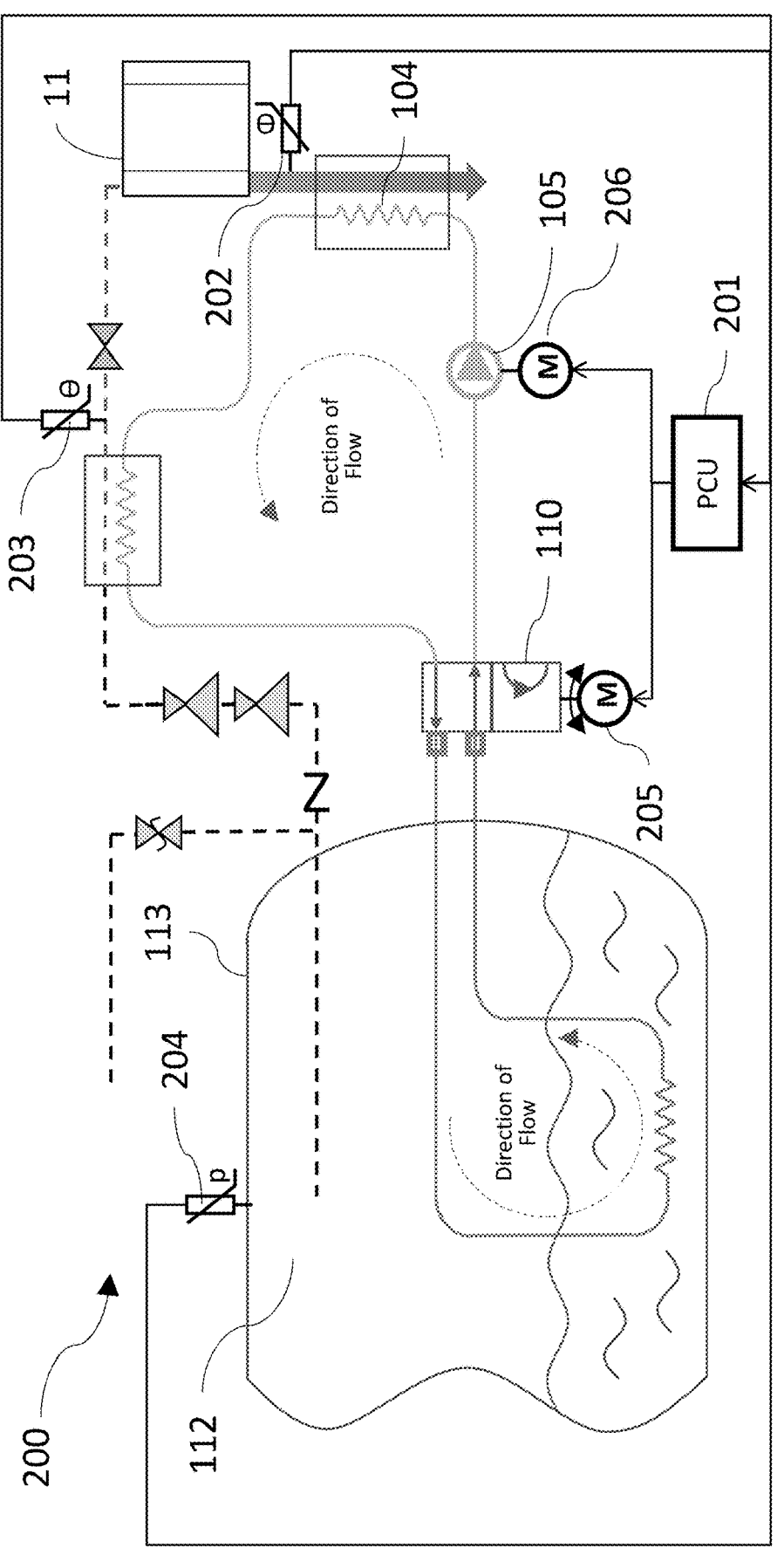
FIG. 4 illustrates an embodiment of the invention, using sensors and active control of the system via a programmable device.

In FIG. 4 the invention is shown with an active control system 200, using sensors and controlling the operation of the fuel delivery system with a Programmable Control Unit 201 (PCU). This alternative embodiment may be useful where very precise control of the input fuel condition to the consuming device 11 is needed, or where optimisation of the cooling potential of the uptake heat exchanger 104 is desired or needed. Various sensors may be used, including in preferred embodiments consumer system temperature sensors 202, gaseous fuel supply temperature sensors 203 and pressure sensors 204 measuring the pressure of the gaseous fuel in the storage vessel 113.

The input of these sensors will be connected to and monitored by the Programmable Control Unit 201, which in some embodiments may be integrated as a function into the overall Propulsion Control Unit controlling the whole system including the consuming device 11. The Programmable Control Unit 201, whether separate or integrated, may control the operation of the vaporiser system through control of the actuation of the main valve 110 via an electric actuator 205 and/or control the speed of electric motor 206 driving the pump 105 and hence controlling the flow rate of the heat transfer fluid.

Figure 5:
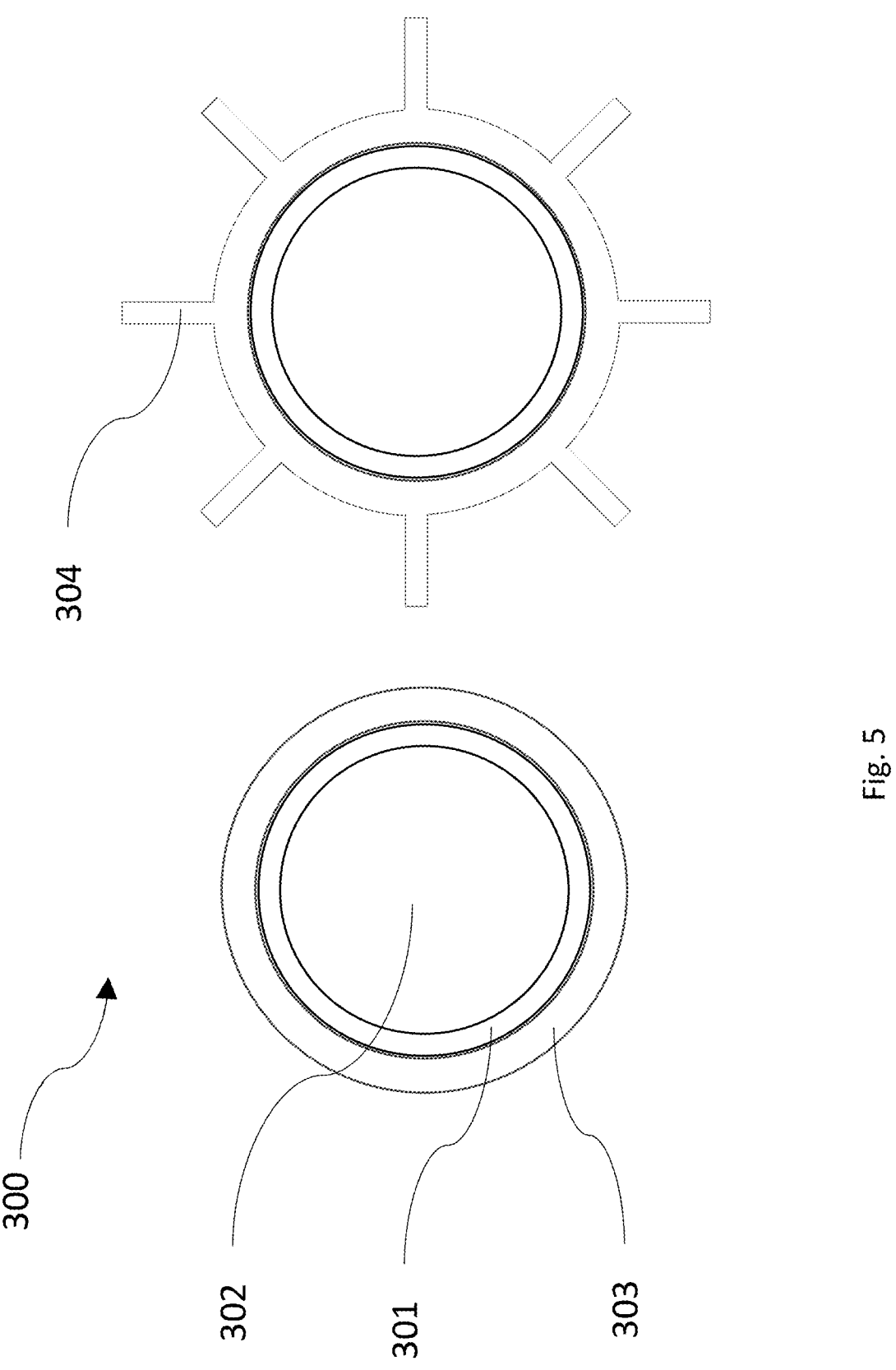
FIG. 5 illustrates an embodiment of double walled pipes and pipes with heat transfer fins for use with the invention.

FIG. 5 shows example embodiments of the double walled pipes 300 for the secondary circuit 102 in particular, but which may optionally be applied to the primary circuit 101 as well. This embodiment has an inner pipe 301 within which the heat transfer fluid 302 flows. Surrounding this inner pipe 301 is an outer pipe 303, which is manufactured to be separate and distinct to the inner pipe 301 so that a flaw or failure in either the inner pipe 301 or the outer pipe 303 will still have the other pipe retaining the heat transfer fluid 302 so that it will not leak into the liquid cryogenic fuel 115 or other part of the vehicle causing contamination. Given the function of the secondary circuit 102 to transfer heat from the heat transfer fluid 302 into the liquid cryogenic fuel 115 both the inner pipe 301 and the outer pipe 303 should be made of materials with good thermal conductivity. In preferred embodiments this may be achieved by the inner pipe being made of stainless steel and the outer pipe 303 being made of aluminium. The outer diameter of the inner pipe 301 in preferred embodiments will be a transition fit to interference fit with the inner diameter of the outer pipe 302 to facilitate good conduction of heat between both pipes.

To aid the heat transfer function of the secondary circuit 102 where higher heat transfer rates are needed, or to reduce the overall length of the secondary circuit 102 for weight sensitive applications by increasing its heat transfer potential, then additional conductive area can be added to the double walled pipe 300, such as the addition of heat transfer fins 304. These heat transfer fins 304 may be longitudinal as illustrated to aid manufacture, such as enabling an extrusion process, but may in alternative embodiments be attached in any orientation to the double walled pipe 300. These heat transfer fins 304 in preferred embodiments will be of a common material to the outer pipe 303 but may be of any appropriate conductive material that can be joined to the double walled pipe 300.

What is claimed is:

1. A fuel delivery system for a vehicle, the fuel delivery system comprising:
   a fuel storage vessel having a liquid fuel zone configured to hold liquid cryogenic fuel and a gaseous fuel zone configured to hold gaseous cryogenic fuel;
   a fuel line configured to transport gaseous cryogenic fuel from the gaseous fuel zone for delivery to a fuel consuming device of the vehicle; and
   a heat transfer circuit comprising heat transfer fluid and an uptake heat exchange element configured to transfer heat from a heat extraction point of the vehicle to the heat transfer fluid, the heat transfer circuit further including:
   a primary heat transfer circuit comprising a primary conduit within which the heat transfer fluid is able to flow, and a warming heat exchange element configured to transfer heat from the heat transfer fluid to the fuel line;
   a secondary heat transfer circuit comprising a secondary conduit within which the heat transfer fluid is able to flow, wherein at least a portion of the secondary conduit is located within the liquid fuel zone and is configured to transfer heat from the heat transfer fluid to the liquid fuel zone; and
   a selector device operable to switch the fuel delivery system between a warming configuration in which the heat transfer fluid flows within the primary heat transfer circuit but not the secondary heat transfer circuit, and a vaporising configuration in which the heat transfer fluid flows within the secondary heat transfer circuit.

2. The fuel delivery system according to claim 1, wherein the selector device comprises a pressure-actuated valve operable to automatically switch the fuel delivery system to the vaporising configuration if a pressure in the gaseous fuel zone falls to a first threshold pressure.

3. The fuel delivery system according to claim 2, wherein the pressure-actuated valve is operable to automatically switch the fuel delivery system to the warming configuration if a pressure in the gaseous fuel zone increases to a second threshold pressure.

4. The fuel delivery system according to claim 1, including a pressure sensor configured to monitor a pressure in the gaseous fuel zone, and a controller configured to operate the selector device to switch the fuel delivery system to the vaporising configuration if the pressure sensor detects a pressure fall to a first threshold pressure.

5. The fuel delivery system according to claim 4, wherein the controller is configured to operate the selector device to switch the fuel delivery system to the warming configuration if the pressure sensor detects a pressure rise to a second threshold pressure.

6. The fuel delivery system according to claim 1, wherein in the vaporising configuration the heat transfer fluid flows within the secondary heat transfer circuit and the primary heat transfer circuit.

7. The fuel delivery system according to claim 6, wherein in the vaporising configuration the heat transfer fluid flows from the primary heat transfer circuit to the secondary heat transfer circuit and from the secondary heat transfer circuit to the uptake heat exchange element.

8. The fuel delivery system according to claim 1, wherein the uptake heat exchange element is located within the primary heat transfer circuit.

9. The fuel delivery system according to claim 1, wherein the heat extraction point of the vehicle is located in one or more of: a fuel consuming device configured to consume fuel delivered by the fuel delivery system; an air intake of a fuel consuming device configured to consume fuel delivered to the heat transfer fluid; an electric motor; a cooling radiator; and an exhaust of a fuel consuming device configured to consume fuel delivered to the heat transfer fluid.

10. The fuel delivery system according to claim 1, wherein the uptake heat exchange element is located such that a maximum temperature at the heat extraction point provides a maximum temperature of the gaseous fuel that is equal to or less than a maximum permitted fuel input temperature of the fuel consuming device of the vehicle.

11. The fuel delivery system according to claim 1, wherein the heat transfer circuit comprises a pump for circulating the heat transfer fluid, the pump being controllable to vary a flow rate of the heat transfer fluid.

12. The fuel delivery system according to claim 11, including one or more fuel line sensors configured to detect one or more parameters of fuel delivered by the fuel line, the pump being controllable to vary a flow rate of the heat transfer fluid in response to parameters detected by the one or more fuel line sensors.

13. The fuel delivery system according to claim 12, wherein the one or more parameters include temperature and/or pressure.

14. The fuel delivery system according to claim 1, wherein the primary conduit and/or the secondary conduit comprises a double-walled pipe comprising an inner pipe and an outer pipe, wherein the inner pipe and the outer pipe are thermally connected to permit thermal transfer therebetween.

15. The fuel delivery system according to claim 1, wherein the at least a portion of the secondary conduit located within the liquid fuel zone comprises one or more heat transfer fins.

16. The fuel delivery system according to claim 1, wherein the heat transfer fluid consists essentially of helium.

17. A method of delivering cryogenic fuel using the fuel delivery system according to claim 1, the method comprising the steps of:

circulating the heat transfer fluid within the heat transfer circuit to transfer waste heat from the heat extraction point of the vehicle to the heat transfer fluid; and selectively operating the selector device to:

switch the fuel delivery system to the warming configuration to circulate the heat transfer fluid within only the primary heat transfer circuit to transfer heat from the heat transfer fluid to the fuel line; and switch the fuel delivery system to the vaporising configuration to circulate the heat transfer fluid within the secondary heat transfer circuit to transfer heat from the heat transfer fluid to the liquid fuel zone.

18. The method according to claim 17, further including the step of operating the selector device to switch the fuel delivery system to the vaporising configuration in response to a fall of a pressure in the gaseous fuel zone to a first threshold pressure, to thereby circulate the heat transfer fluid within the secondary heat transfer circuit to transfer heat from the heat transfer fluid to the liquid fuel zone.

19. A method according to claim 17, further including the step of operating the selector device to switch the fuel delivery system to the warming configuration in response to an increase of a pressure in the gaseous fuel zone to a second threshold pressure, to thereby circulate the heat transfer fluid within only the primary heat transfer circuit to transfer heat from the heat transfer fluid to the fuel line.

* * * * *